US012671799B2

(12) United States Patent
Zerega et al.

(10) Patent No.: US 12,671,799 B2
(45) Date of Patent: Jun. 30, 2026

(54) SYSTEM AND METHOD FOR ADVANCED VISUALIZATION AND AUTOMATED PRODUCTION TOOLS FOR AUTOSTEREOSCOPIC 3D, MULTIVIEW AND VOLUMETRIC DISPLAYS

(71) Applicant: Magnetic Media Holdings, Inc., New York, NY (US)

(72) Inventors: Thomas Zerega, Parkland, FL (US); John Martin Bracciante, Jr., Croton On Hudson, NY (US); Zachary Bennett, Benson, NC (US)

(73) Assignee: Magnetic Media Holdings, Inc., New York, NY (US)

( * ) Notice: Subject to any disclaimer, the term of this patent is extended or adjusted under 35 U.S.C. 154(b) by 182 days.

(21) Appl. No.: 18/432,481

(22) Filed: Feb. 5, 2024

(65) Prior Publication Data

US 2024/0267507 A1      Aug. 8, 2024

Related U.S. Application Data

(60) Provisional application No. 63/483,131, filed on Feb. 3, 2023.

(51) Int. Cl.
| | |
|---|---|
| *G06T 15/20* | (2011.01) |
| *G06T 17/00* | (2006.01) |
| *H04N 13/351* | (2018.01) |
| *H04N 13/388* | (2018.01) |

(52) U.S. Cl.
CPC ........... *H04N 13/388* (2018.05); *G06T 17/00* (2013.01); *H04N 13/351* (2018.05)

(58) Field of Classification Search
CPC ....... G06T 15/20; G06T 13/20; G06T 15/503; G06T 2207/30244; G06T 17/00; G06T 15/08; G06T 2219/028; G06T 7/80; G06T 7/97; G06F 3/011; H04N 21/21805; H04N 13/117; H04N 21/4223; H04N 13/388
See application file for complete search history.

(56) References Cited

U.S. PATENT DOCUMENTS

2014/0049536 A1*    2/2014   Neuman .............. H04N 13/243
345/419

* cited by examiner

*Primary Examiner* — Hau H Nguyen
(74) *Attorney, Agent, or Firm* — Schott, P.C.

(57) ABSTRACT

A system for visualization includes a camera rig having a plurality of cameras that capture images from one or more perspectives; and at least two visual guides defining a volumetric space within an environment that may be physical, virtual, and/or a hybrid of the two and associated with the camera rig. The volumetric space is updated based on changes to one or more parameters associated with camera rig, manually, automatically, and/or in real-time.

18 Claims, 10 Drawing Sheets

102

104

206

208

210

212

402

404

406

408

500

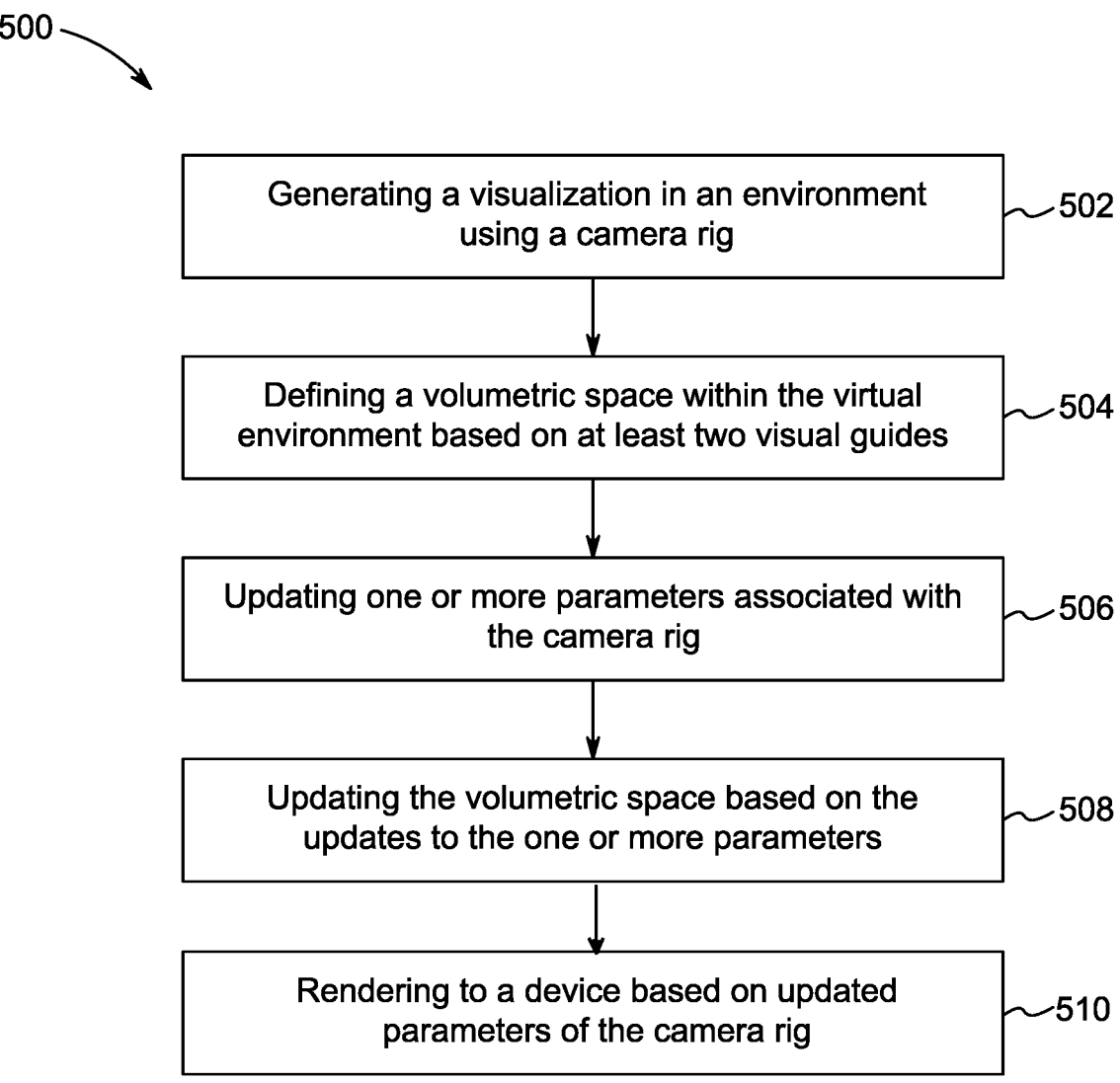

Generating a visualization in an environment using a camera rig ⌇502

Defining a volumetric space within the virtual environment based on at least two visual guides ⌇504

Updating one or more parameters associated with the camera rig ⌇506

Updating the volumetric space based on the updates to the one or more parameters ⌇508

Rendering to a device based on updated parameters of the camera rig ⌇510

FIG. 5

SYSTEM AND METHOD FOR ADVANCED VISUALIZATION AND AUTOMATED PRODUCTION TOOLS FOR AUTOSTEREOSCOPIC 3D, MULTIVIEW AND VOLUMETRIC DISPLAYS

RELATED APPLICATION(S)

This application claims priority under 35 U.S.C. § 119(e) of the U.S. Provisional Patent Application having Ser. No. 63/483,131, filed Feb. 3, 2023, and titled "System And Method For Advanced Visualization And Production For Autostereoscopic 3D, Multiview And Volumetric Displays" which is hereby incorporated by reference in its entirety.

FIELD OF THE DISCLOSURE

The embodiments discussed are generally related to advanced production and visualization methods for content generation and, more particularly, to an advanced level of control and time-saving tool for capturing and producing content for displays, including but not limited to multiview glasses-free three-dimensional (3D) displays.

BACKGROUND OF THE DISCLOSURE

Traditionally, virtual camera rigs are employed in various software applications, such as graphic design, motion graphics, 3D modeling, animation, engineering, video games, imaging, and visualization. The cameras in these applications capture the scene virtually and then render the content offline and/or in real-time for two-dimensional (2D) or three-dimensional (3D) viewing, with 3D viewing requiring a minimum of two cameras, one view for each human eye.

With the emergence of 3D technologies for spatial computing systems such as Augmented Reality, Virtual Reality, or Mixed Reality, and 3D viewing systems that do not require 3D glasses, there is a need to adapt these camera rigs to showcase content on such devices effectively. A significant hurdle in the adoption of glasses-free 3D technology, not that this disclosure is limited to this, however, is the manual construction of camera rigs by creators or users, who must meticulously test and output multiple viewpoints to achieve a proper 3D effect on the display or device.

Accordingly, there exists a need for an advanced visualization and automated production tool for effectively capturing and producing content for displays, including but not limited to multiview glasses-free three-dimensional (3D) displays.

SUMMARY OF THE DISCLOSURE

The following represents a summary of some embodiments to provide a basic understanding of various aspects of the disclosed herein. This summary is not an extensive overview of the present disclosure. It is not intended to identify critical elements or delineate the present disclosure's scope. Its sole purpose is to present some embodiments in a simplified form as a prelude to the more detailed description presented below.

The subject matter herein may include a system for advanced visualization. The system includes a camera rig comprising a plurality of cameras configured to capture images from one or more perspectives and at least two visual guides defining a volumetric space within a virtual environment associated with the camera rig, wherein the volumetric space is updated based on one or more parameters associated with the camera rig.

The system may further include a physical display associated with the camera rig such that the volumetric space is defined by the properties of the physical display.

The camera rig may be physical, although this description may often reference virtual camera rigs.

The one or more parameters associated with the camera rig may include at least one of a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras.

The camera rig parameters may be automatically optimized in real-time based on user input or changes to one or more parameters. The user can update the parameters through a graphical user interface, visualization tools, API, SDK, and otherwise, as described herein, and when one parameter changes, the other parameters may automatically adjust in response thereto.

The camera rig may be configured to generate two or more perspectives that may include similar information from different perspectives to generate a three-dimensional (3D) visualization.

The at least two visual guides may include a pop (forward projection or −Z Axis relative to the camera coordinates) guide defining an optimal and safe position for forward projection of an object in a scene and a depth guide defining an optimal position and safe area for depth positioning of an object in the scene, wherein an area between the pop guide and the depth guide defines the optimal volumetric space. Further, the system may include a two-dimensional (2D) guide defining a point where objects appear at the plane of the physical display or device and may not have motion parallax. Lastly, the system may include a threshold guide defining the upper limit for maximum forward projection of an object in a scene;

The system may further include a graphic user interface configured to enable a user to visualize and modify one or more parameters associated with the camera rig.

The subject matter herein describes a method that generates a visualization in a virtual environment using a camera rig comprising a plurality of cameras configured to capture images from one or more perspectives; and defines a volumetric space within the virtual environment based on at least two visual guides, wherein the volumetric space is updated based on one or more parameters associated with the camera rig.

The one or more parameters associated with the camera rig include at least one of a focal length of one or more of the plurality of cameras, interocular distance between one or more of the plurality of cameras, a convergence point of camera views, scale of the camera rig, a position of one or more of the plurality of cameras, and an orientation of one or more of the plurality of cameras.

The method may further include a camera rig that may be configured to generate two or more perspectives that may include similar information from different perspectives to generate a three-dimensional (3D) visualization.

The at least two visual guides are described above and elsewhere herein.

The method may further include continuously casting an invisible plane forward from the camera rig; reverting a cast distance when the invisible plane hits an object in the virtual environment; and systematically reducing the cast distance to determine a position of a forward-most geometry of the object to modify and adjust the parameters of the volumetric space captured via the camera rig automatically in real-time.

The method may further include modifying the volumetric space by adjusting the camera rig's scale based on the object's determined center point to align the two-dimensional (2D) guide with the object's center point automatically and in real-time.

The method may further include modifying the volumetric space by adjusting the interocular distance between one or more of the plurality of cameras based on the determined position of the forward-most geometry of the object until the pop guide aligns to the determined position automatically and in real-time.

The embodiments may relate to non-transitory computer-readable storage medium, having stored thereon a computer-executable program which, when executed by at least one processor, causes the at least one processor to generate a visualization in a virtual environment using a camera rig comprising a plurality of cameras configured to capture images from one or more perspectives; and define a volumetric space within the virtual environment based on at least two visual guides, wherein the volumetric space is updated based on one or more parameters associated with the camera rig.

The computer-executable program may further cause the at least one processor to define an optimal position for forward projection of an object in a scene using a pop guide; and define an optimal position for depth positioning of the object in the scene using a depth guide, wherein an area between the pop guide and the depth guide defines the volumetric space.

The computer-executable program may further cause at least one processor to define the upper limit for maximum forward projection of an object in a scene referred to as the threshold guide, a point where objects appear at the plane of the physical display or device and may not have motion parallax and may appear as a two-dimensional (2D) object.

The computer-executable program may further cause at least one processor to cast an invisible plane forward from the camera rig; revert a cast distance when the invisible plane hits an object in the virtual environment; and continuously reduce the cast distance to determine a position of a forward-most geometry of the object; adjust a scale of the camera rig, based on the determined position of the forward-most geometry of the object, to align the two-dimensional (2D) guide with a center point of the object; and adjust an interocular distance between one or more of the plurality of cameras until the pop guide aligns to the determined position of the forward-most geometry of the object and/or the depth guide aligns to the determined position of the rear-most geometry of the object or scene.

The above summary is provided to summarize some example embodiments to provide a basic understanding of some aspects of the disclosure. Accordingly, it will be appreciated that the above-described embodiments are examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF DRAWINGS

Further advantages of the disclosure will become apparent by reference to the detailed description of preferred embodiments when considered in conjunction with the drawings. In the drawings, identical numbers refer to the same or a similar element.

FIG. 5 illustrates a sequential flow diagram for generating advanced visualization, in accordance with the embodiments presented herein.

Figure 1A:
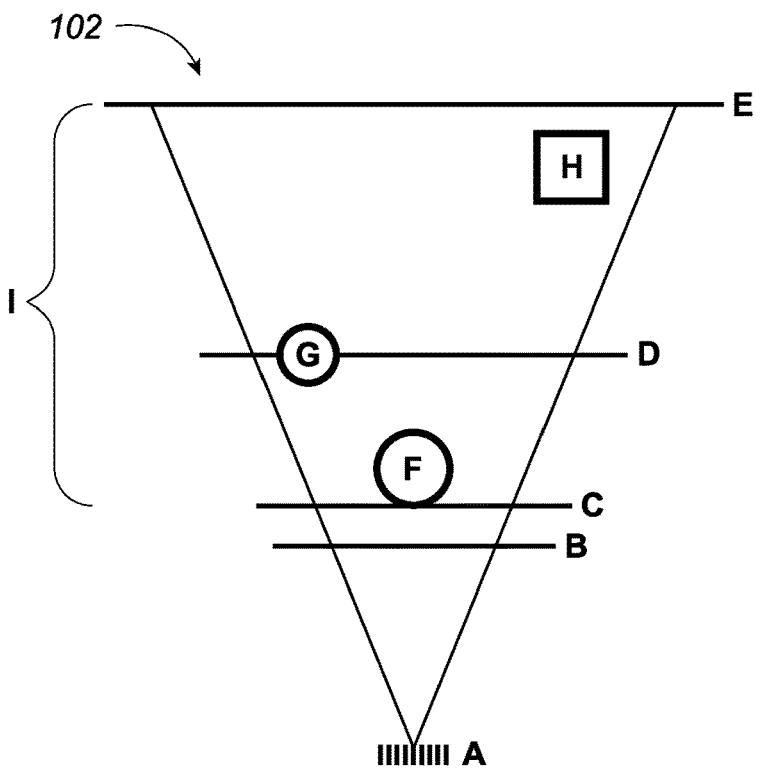
FIG. 1A illustrates an overhead view of a scene in the disclosed virtual environment, in accordance with the embodiments presented herein.

The headings used herein are for organizational purposes only and are not meant to be used to limit the scope of the description. As used throughout this application, the word "may" be used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures. Optional portions of the figures may be illustrated using dashed or dotted lines unless the usage context indicates otherwise.

DETAILED DESCRIPTION

Introduction

The following detailed description is presented to enable a person skilled in the art to make and use the disclosure. For purposes of explanation, specific details are set forth to provide a thorough understanding of the present disclosure. However, it will be apparent to one skilled in the art that these specific details are not required to practice the disclosure. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown but is to be accorded the widest possible scope consistent with the principles and features disclosed herein.

Certain terms and phrases have been used throughout the disclosure and will have the following meanings in the context of the ongoing disclosure.

A "camera rig" may be virtual or physical in nature or a hybrid, thus having properties of both, and refers to an assembly that may include hardware, software, and mechanisms designed to support a plurality of cameras to be operated in real life or within a computer program to capture a plurality of views of an object or scene. It may include a physical or virtual frame or structure that allows for the mounting of cameras. Additionally, and/or alternatively, it may support mounting of various accessories like lenses, monitors, depth sensors such as lidar, microphones, and/or lighting equipment. A camera rig may include features for adjusting camera angles, camera lenses of varying focal length or optical properties, height, and orientation, and can include components such as rails, sliders, gimbals, and counterweights to facilitate smooth movement and stability.

The term "visual guides" may refer to a set of on-screen and/or in-scene overlays that assist in framing, aligning, and composing a scene and/or a shot. These overlays assist in achieving desired visual aesthetics and maintaining consistency in 3D content creation. A visual guide may divide the volumetric space into segments for aligning objects behind, in front, along, or at their intersection to provide an optimal 3D composition to be presented to the viewer. In other cases, a visual guide may change dimension based on the intended aspect ratio of a final output or orientation thereof and/or show the edge of the camera view to provide a visible cone wherein objects within the cone will be rendered in 3D ensuring that essential elements will be visible.

The visual guides may provide maximum and minimum parallax recommendations within a software. The visual guides and/or guide planes remain synchronized to one another and represent the parallax limits of a given display device in the real world and concerning the human visual system's ability for stereopsis or fusing a pair of stereo images. These visual guides may be used in a visualization and production tool and/or software, providing technical assistance to users for achieving precise and aesthetically pleasing visual compositions.

The term "virtual environment" may refer to a digitally created space, simulated by computer software, that provides a user an immersive and interactive experience, including environments that use spatial computing and mixed reality. It may be a computer-generated, three-dimensional representation of a setting or series of settings in which users can navigate, interact, and manipulate virtual objects or elements. This environment can be designed to mimic real-world locations or create entirely fictional spaces. Technical aspects associated with a virtual environment may include rendering of graphics, processing user input, simulating physics for realistic movements and interactions, and potentially integrating sensory feedback mechanisms such as visual, auditory, and haptic cues. Virtual environments are commonly used in applications like virtual reality (VR), augmented reality (AR), video games, training simulators, digital twins, geospatial imaging, virtual tours, and various other systems. They may require hardware and software, including computers or dedicated systems, graphical processing units, input devices like controllers, headsets, or gloves, and software frameworks that manage rendering, physics, and user interaction.

A "device" may refer to an apparatus using electrical, mechanical, thermal, etc., power and having several parts, each with a definite function and performing a particular task together. In accordance with the embodiments, a device may include but is not limited to, a user device, a server device, and/or a combination of the two.

A "processor" may include a module that performs the methods described herein. The module of the processor may be programmed into the integrated circuits of the processor or loaded in memory, storage device, network, or combinations thereof.

At least two use cases, beyond and perhaps included in those mentioned herein, include using the rig with user input that results in automatic updates to the rig parameters to accurately define the volumetric space, which is generally for offline content creation such as modeling and animation, but could be employed with computer-aided design work or any other visualization requirements including real-time applications such as geospatial imaging and the like. The second use case may be producing interactive content or experiences where a user creates a video game and needs the objects in the scene to dictate the parameters of the rig in real time to optimize the 3D effect.

Description

A system for advanced visualization and/or production for 3D content generation may provide an advanced level of control and time-saving tools for producing content for N view glasses-free 3D displays, where N represents any number of views greater than 1. The system automates the relationship between various parameters of a camera rig and/or associated plurality of cameras to ensure that all parameters affecting the visualization of the 3D content are synchronized to accommodate any changes made by the user and/or the system. These parameters may include, but are not limited to, a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras.

The system and method may provide control and time-saving tools for producing content for N view glasses-free 3D displays, where N represents any number of views greater than 1. The system automates the relationship between various parameters of a camera rig and/or associated plurality of cameras to ensure that all parameters affecting the visualization of the 3D content are synchronized to accommodate any changes made by the user and/or the system. These parameters may include but are not limited to, a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras.

The system and associated method further improve the speed, accuracy, and quality of content that can be produced by a user while providing the flexibility to integrate this level of control into new and existing projects. The techniques used by the system and/or method are language-agnostic and can be deployed and integrated across various software platforms.

The embodiments may allow creators to change various content creation parameters in real time to affect the amount of 3D space and/or volume within a scene. It may allow creators to create and produce multi-camera content accurately and more quickly. The camera rig and/or the virtual camera rig could be designed or adapted to operate with physical cameras and integrate with analog, digital, and hybrid virtual-production platforms.

Furthermore, the system may streamline the output of content to various display devices and support multiple content formats and device orientations for greater compatibility, usability, and distribution of 3D content. The system supports any display type, such as, but not limited to, lenticular, light field, holographic, electro-wedding, parallax barrier, volumetric, switchable filters, or hybrid optical systems that may combine various autostereoscopic modalities, etc. Other display types and technologies may also be used with the system and method described herein. Furthermore, the system and method may also be used with AR and/or VR and/or Mixed Reality headsets and/or 3D Glasses and/or 3D displays.

The preceding is neither an extensive nor exhaustive overview of the present invention and its various embodiments. Other embodiments of the present invention are possible utilizing, alone or in combination, one or more of the features set forth above or described in detail below.

As used herein, the singular forms "a," "an," and "the" designate both the singular and the plural unless expressly stated to designate the singular only.

The embodiments of the methods and systems are described in more detail with reference to FIGS. 1-5.

FIG. 1A illustrates a scene in a virtual environment 102. As shown in FIG. 1A, a camera rig A is provided. The camera rig A includes a plurality of cameras for capturing images from one or more perspectives and/or views. For example, the camera rig A may include N number of cameras, where N represents any number of views greater than or equal to one, with a minimum of two cameras to create three-dimensional (3D) content. The camera rig A may be designed to support and stabilize a plurality of cameras and may include features for adjusting camera angles, height, and orientation to facilitate smooth movement and stability.

Further, the virtual environment 102 includes a plurality of visual guides B, C, D, and E. As described above, the visual guides B, C, D, and E may provide maximum and minimum parallax recommendations within a software to define the volumetric space. The visual guides and/or guide planes may remain synchronized to one another and represent the parallax limits of a given display device in the real world and with respect to the human visual system's ability for stereopsis.

The placement of visual guides is influenced by several factors, such as, but not limited to, camera and/or lens focal length, aperture setting, sensor size, lens design, physical display and its optical properties, interocular distance of the cameras, scale of the scene, and the like.

The visual guide B, as shown in FIG. 1A, is a threshold guide defining a threshold limit for forward projection of an object in a scene. The threshold guide represents the threshold or absolute limit recommended for forward projection of any object in the scene, while visual guide C represents a safe zone for achieving consistent results with maximum parallax. The threshold guide refers to the theoretical distance at which captured content may still appear clear and focused on the physical display, which is subjective and based on the content elements themselves, including but not limited to the composition of the scene, the type of objects, materials, textures, lighting, the speed and direction of movement, etc.

Thus, visual guide B represents an area where the object may no longer be able to be viewed clearly and may begin to double, have distortion, or have a ghosting effect where waves or ripples appear on the outer walls and/or edges of the object.

Further, visual guide C, as shown in FIG. 1A, is a pop guide defining an optimal position to maximize forward projection of an object in a scene. The pop guide represents the best practices limit for forward projection of an object in the scene. Any object between visual guides C and B should be able to be viewed clearly while the object will appear to be 3D, holographic, or floating in front of the display to the viewer.

The visual guide D, as shown in FIG. 1A, is a two-dimensional (2D) guide defining both the front surface of a physical display device and the convergence point of the captured views wherein part of an object intersecting visual guide D will have neither negative nor positive parallax—and subject to the type of object—may appear two-dimensional (2D). For added clarity, it represents the point where an object in the scene will appear to be at the surface of the physical display device and thus, may be seen as a 2D object.

The visual guide E, as shown in FIG. 1A, is a depth guide defining an optimal position to maximize depth positioning of the object in the scene. It represents the best practices limit for depth positioning of an object in the scene. Any object between visual guides E and D should be able to be viewed clearly while the object will appear to be 3D, holographic, or floating in the scene's background to the viewer.

The area I, as shown in FIG. 1A, is the area between the visual guide C, that is, the pop guide, and visual guide E, that is, the depth guide. The area I defines a volumetric space within a virtual environment associated with the camera rig A. It is the 3D working area of the scene representing the optimized volumetric space for 3D viewing. The area I or the volumetric space is defined by the parameters of the camera rig and is updated based on a change in one or more parameters associated with the camera rig.

The volumetric space refers to a three-dimensional area where objects and scenes have volume and exist within a perceivable depth. This space may be characterized by the following aspects: Three-Dimensional Coordinates, that is, objects in volumetric space are defined by their position along the X, Y, and Z axes, allowing for a representation of depth, width, and height; Perceptible Depth, that is, unlike 2D spaces, where objects are flat, volumetric space allows for the perception of depth, giving a more realistic and immersive experience; Viewing Experience, that is, when viewed through appropriate technology such as AR/VR headsets, 3D glasses, or advanced display systems, volumetric space can provide a sense of immersion, as objects appear to exist in real space and may be visible around the viewer; and Interactivity, that is, in interactive 3D environments, users can often navigate and interact within this volumetric space, moving around objects, and viewing them from different angles. Volumetric space is a fundamental concept in 3D technologies, including virtual reality, augmented reality, 3D cinema, and advanced computer graphics, and is essential for creating realistic and engaging 3D experiences.

FIG. 1A also includes objects G, F, and H. G is a Capsule-shaped object in scene, F is a Sphere-shaped object in scene, and H is a Cube-shaped object in scene. Each o is present at different positions and/or locations within the scene. For example, object G is located at the 2D guide, that is, visual guide D, as shown. Object F is located at the pop guide, that is, visual guide C, as shown. Further, object H is located within the area I, that is, the volumetric space and/or the 3D working area of the camera rig.

Figure 1B:
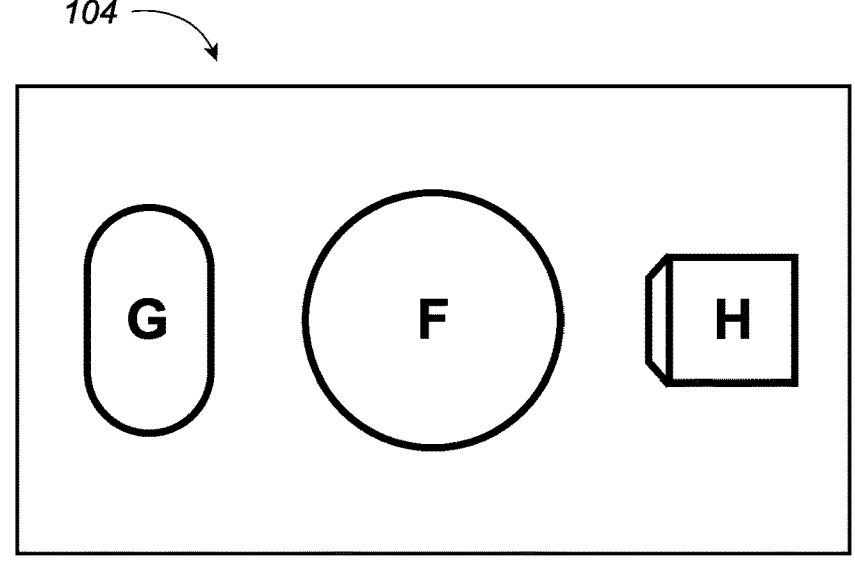
FIG. 1B illustrates a 3D view generated by a plurality of cameras of a camera rig, in accordance with the embodiments presented herein.

FIG. 1B illustrates a 3D view generated by a plurality of cameras of the camera rig A as shown in FIG. 1A. As shown in FIG. 1B, the 3D Capsule-shaped object G located at the 2D guide D in scene appears mostly as a 2D object with limited parallax at the screen's surface. A sphere-shaped object F located at the pop guide C in scene, appears holographic and to be floating in front of the display. Further, the Cube-shaped object H located within the area I in scene, appears as a 3D object present in the scene's background.

FIGS. 2A-2F illustrate the impact of adjusting the settings for focal length, interocular distance, and scaling of the camera rig on the generated 3D scene. It should be noted that each object in the scene, that is, the Capsule-shaped object G, the Sphere-shaped object F, and the Cube-shaped object H, are stationary and do not change position relative to each other.

Figure 2A:
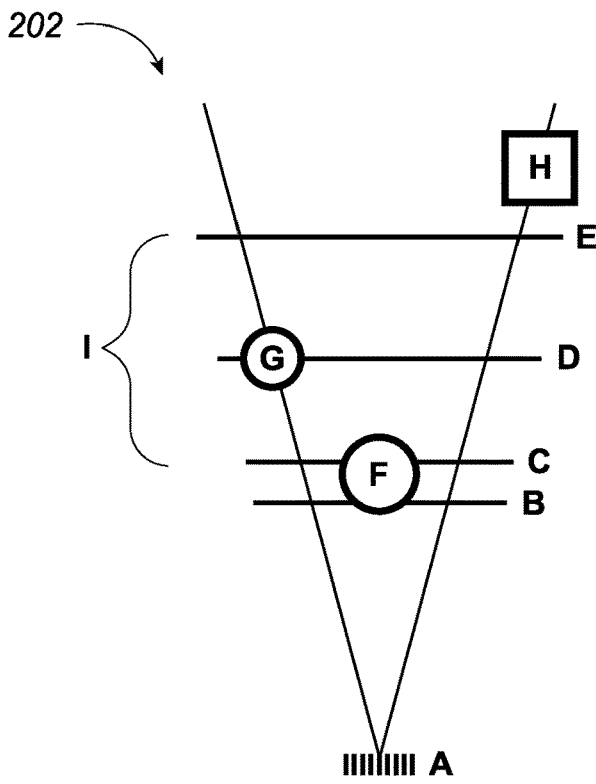
FIG. 2A illustrates an overhead view of the scene with a first focal length setting, in accordance with the embodiments presented herein.

Specifically, FIG. 2A illustrates an overhead view of the scene 202 with a first focal length setting. For example, the first focal length setting may include a focal length of 80. As shown, with the first focal length setting, the objects (F, G, H) are not optimally positioned in the scene and, in some instances, the objects are outside of the 3D working area (I). The Sphere-shaped object F is extended beyond the Pop and the Threshold plane (Visual Guides C and B, respectively) and may not be clear to the viewer. The Capsule-shaped object G and the Cube-shaped object H are both partially out of the scene and will not be visible in their entirety. In addition, the Cube-shaped object H is beyond the visual guide E or the depth plane and may not be clear to the viewer. Both Sphere-shaped object F and the Cube-shaped object H are likely to present visual distortions and/or ghosting effects to the viewer of a given display device.

Figure 2B:
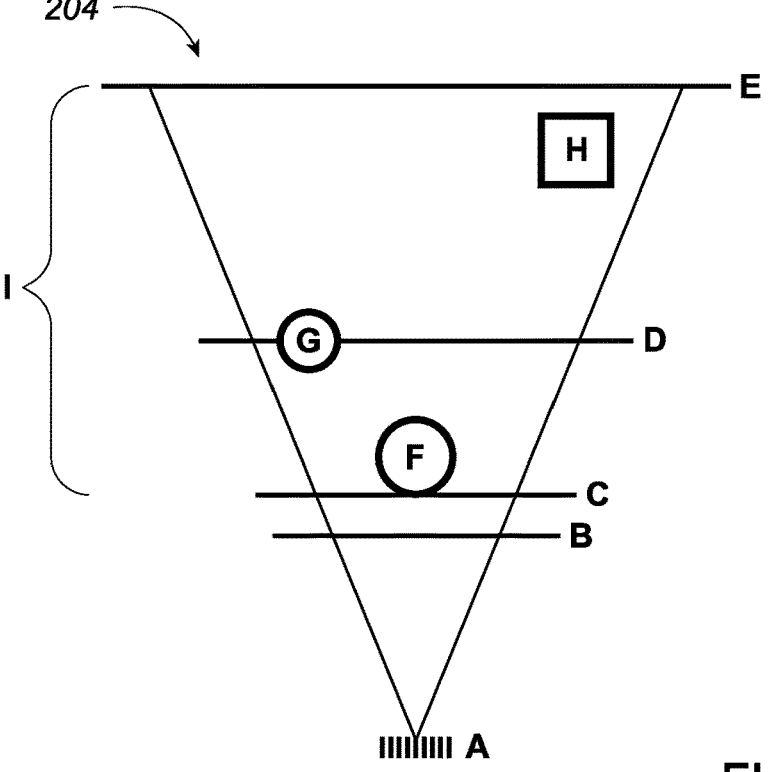
FIG. 2B illustrates an overhead view of the scene with a second focal length setting, in accordance with the embodiments presented herein.

FIG. 2B illustrates an overhead view of the scene 204 with a second focal length setting. For example, the second focal length setting may include a focal length of 50. With this setting, all objects are optimally positioned in the scene within the 3D working area (I). The sphere-shaped object F is located behind the pop guide or visual guide C and will be clear when viewed in 3D. The Capsule-shaped object G and Cube-shaped object H are now both in the scene and can be seen in their entirety. Finally, the cube-shaped object H is in front of the visual guide E or the depth plane (E) and will be clear when viewed on a given display device.

Figure 2C:
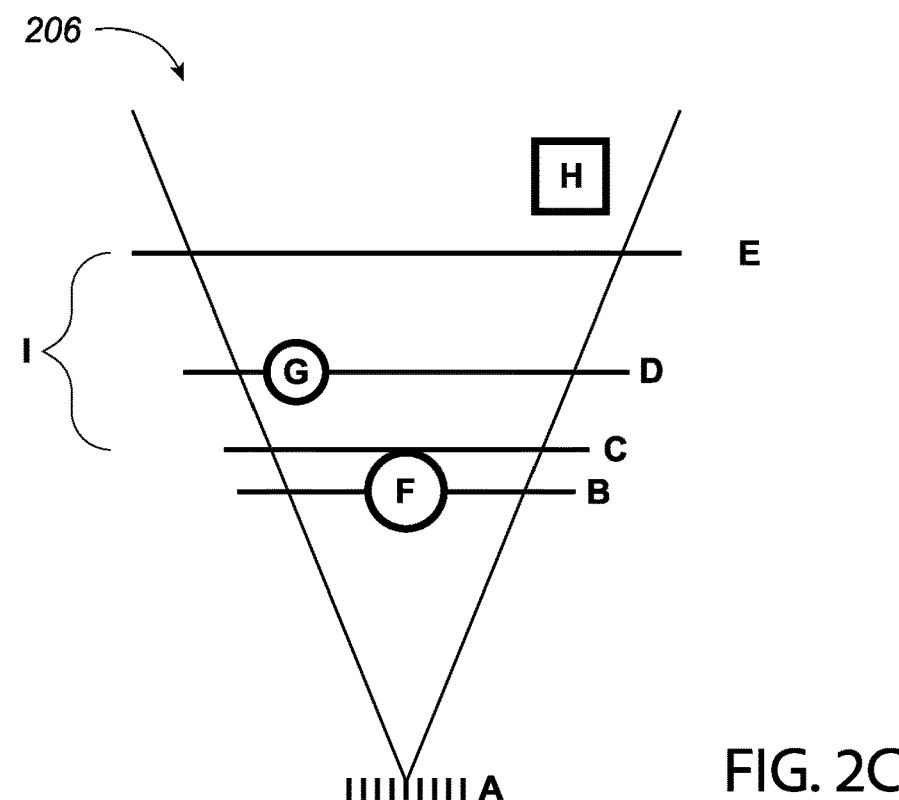
FIG. 2C illustrates an overhead view of the scene with a first interocular distance setting, in accordance with the embodiments presented herein.

FIG. 2C illustrates an overhead view of the scene 206 with a first interocular distance setting. In a multi-camera rig, such as camera rig A, "interocular distance" refers to the distance between the centers of the lenses of two cameras that are used to simulate human binocular vision, such as, in stereoscopic 3D imaging, two cameras are used to capture images from slightly different perspectives, mimicking the way human eyes perceive depth. By adjusting the interocular distance, users can manipulate the depth perception in the resulting 3D image. A larger interocular distance can exaggerate the perception of depth, while a smaller interocular distance can reduce the perception of depth.

FIG. 2C shows that the first interocular distance setting may include an interocular distance setting of 0.3. With this setting, the objects (F and H) may not be optimally positioned in the scene, with Cube-shaped object H being outside of the 3D working area (I). The sphere-shaped object F is beyond the visual guide B or the threshold plane area and will not be clear when viewed in 3D. The cube-shaped object H is outside of the 3D working area (I) and will not be in focus when being viewed in 3D and will present visual distortion and/or ghosting effect when seen on display.

Figure 2D:
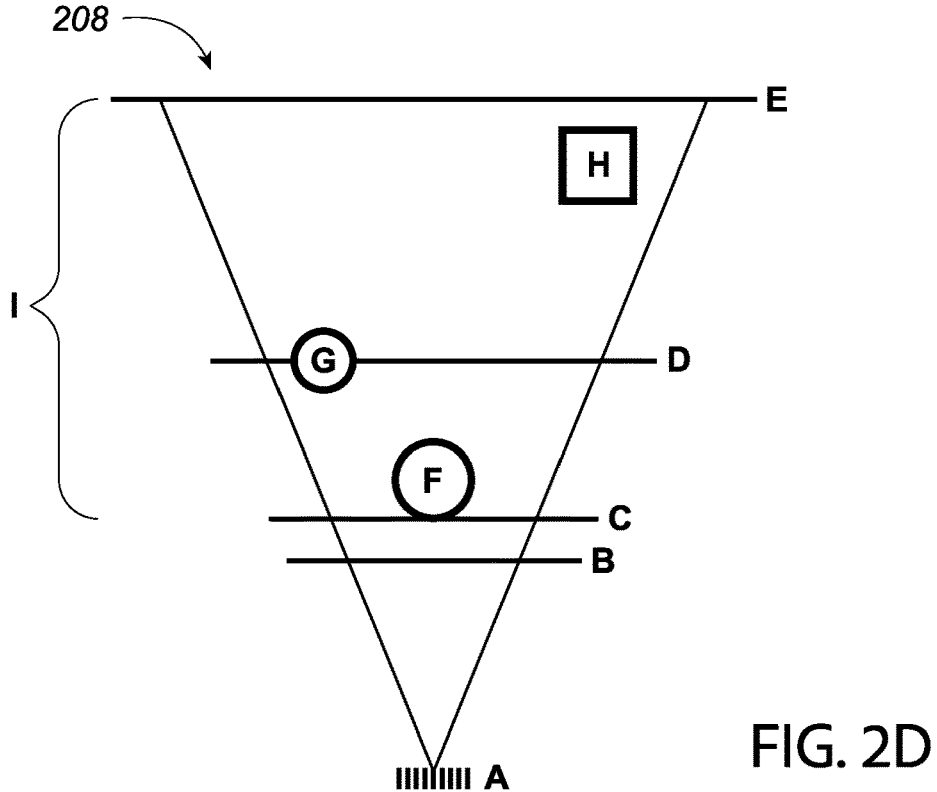
FIG. 2D illustrates an overhead view of the scene with a second interocular distance setting, in accordance with the embodiments presented herein.

FIG. 2D illustrates an overhead view of scene 208 with a second interocular distance setting in accordance with the embodiments presented herein. For example, the second interocular distance setting may include an interocular distance setting of 0.1. As shown, with this setting all objects are optimally positioned in the scene within the 3D working area (I). The sphere-shaped object F is behind the visual guide C or the pop guide and will be clear when viewed in 3D. The cube-shaped object H is now inside the 3D working area (I) and will be clear when viewed in 3D.

Figure 2E:
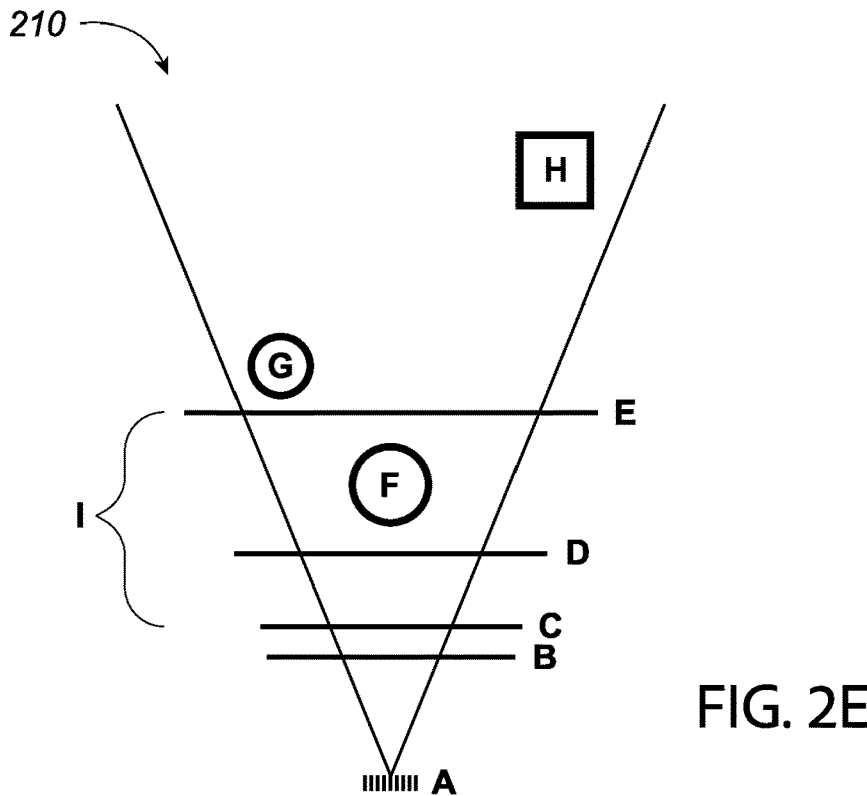
FIG. 2E illustrates an overhead view of the scene with a first scale of the camera rig, in accordance with the embodiments presented herein.

FIG. 2E illustrates an overhead view of the scene 210 with a first scale of the camera rig. The scale of a camera rig may refer to the adjustment of the physical size or configuration of the rig to accommodate different scene scales and to increase or decrease the position of the convergence point for optimal use. This involves altering aspects such as the number of cameras, their positions, and the distances between them. For example, the first scale of the camera rig may include a scale of 0.5. As shown, with this setting, the objects (F, G, H) are not optimally positioned in the scene, and, in some instances, the objects are outside of the 3D working area (I). The Capsule-shaped object G and the Cube-shaped object H are beyond the visual guide E or the depth plane and will not be in focus when viewed in 3D and will present visual distortion and/or ghosting effect when seen on the display.

Figure 2F:
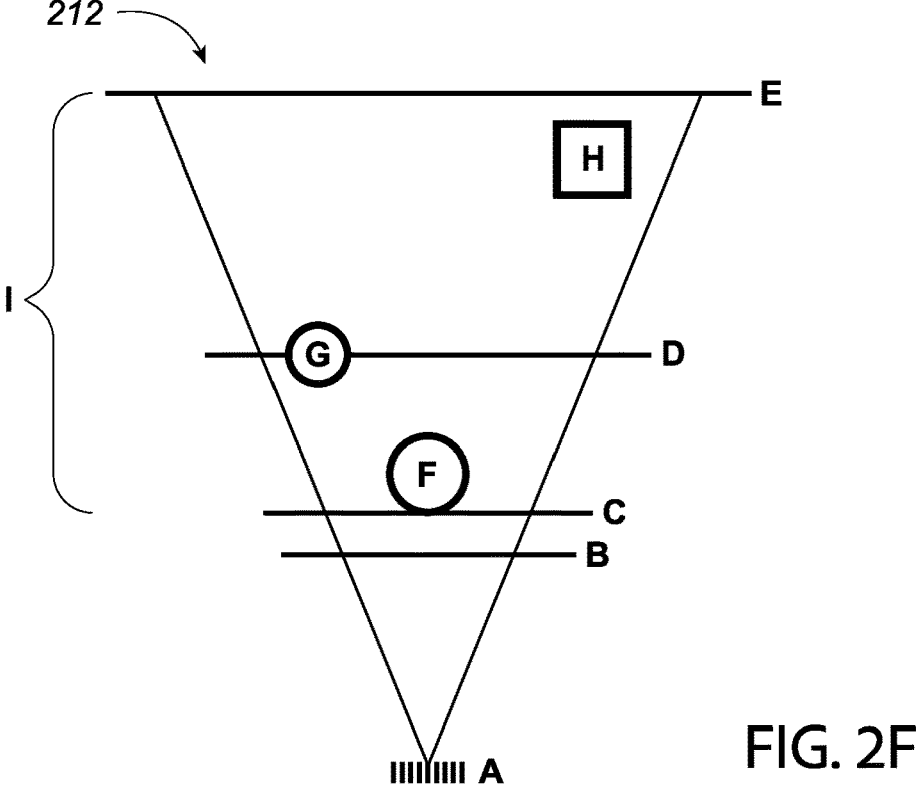
FIG. 2F illustrates an overhead view of the scene with a second scale of the camera rig, in accordance with the embodiments presented herein.

FIG. 2F illustrates an overhead view of the scene 212 with a second scale of the camera rig, in accordance with the embodiments presented herein. For example, the second scale of the camera rig may include a scale of 1.0. With this setting, all objects are optimally positioned in the scene within the 3D working area (I). The camera rig A can be scaled to accommodate scenes where the objects are either too close or too far away from the camera rig A, and outside of the 3D working area (I). The scale can also adjust the position of the 2D visual guide D or the convergence point to better fit the scene.

Figure 3:
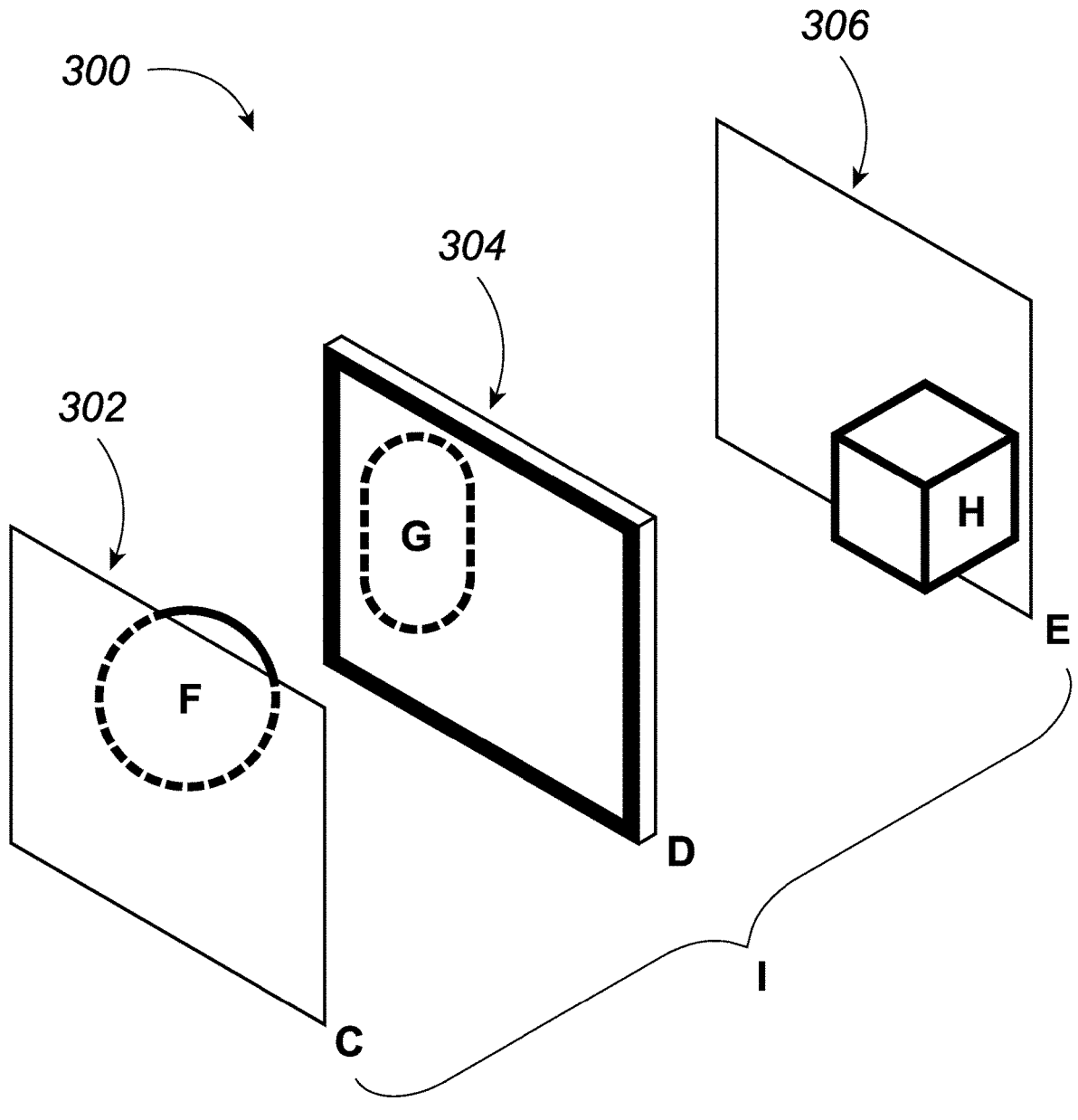
FIG. 3 illustrates an expanded view of a 3D working area with visual guides and objects, in accordance with an embodiment of the present disclosure.

FIG. 3 illustrates an expanded view of a 3D working area with visual guides and objects, in accordance with an embodiment of the present disclosure. As shown in FIG. 3, the 3D working area or the volumetric space I is defined as an area between the pop plane 302 and the depth plane 306. The pop plane 302 is defined by the visual guide C, and the depth plane 306 is defined by the visual guide E, as described earlier. The 3D working area or the volumetric space I further includes a 2D plane 304 defined by the visual guide D, as described earlier. The objects G, F, and H are located along these planes within the 3D working area or volumetric space I, as shown in FIG. 3.

In accordance with the embodiments, the user may adjust the camera rig settings, which include settings to adjust the volumetric space, visual guides, interocular distance, and other parameters to be updated to their optimal positions in real-time. For example, a visualization and/or production tool and/or system may automatically adjust the camera rig scale and camera interocular distance to get the ideal amount of 3D volumetric space for the scene, thus saving time and removing guesswork to produce optimal 3D results for the user. Furthermore, in accordance with the embodiments, the camera rig settings can be automatically adjusted based on an object's position in the camera's view in real-time.

In an embodiment, for automatically adjusting one or more parameters associated with the camera rig, an invisible plane may be cast forward from the camera. If the invisible plane has not collided with any object, then the system may repeat that distance forward again. When the invisible plane does hit an object, it reverts the cast distance. The system cuts that distance in half, and then casts it forward by the new lower distance. This process repeats as it narrows in on the exact position of the forward-most geometry of the object from the camera view. Once that position value is determined, the system may adjust the scale of the camera rig to get the 2D plane 304 aligned with the object's center point. Then, the system may adjust the interocular distance between cameras until the pop plane 302 aligns to the determined position of the forward-most geometry of the object. A person of ordinary skill in the art could understand that this process could be similarly done for a rear-most geometry, though a forward-most discussion and examples are the focus of the discussion herein.

The system also allows creators to change various content creation parameters in real-time to affect the amount of 3D space or volume. It provides creators with the unique ability to confidently create and produce 3D content accurately and more quickly, precisely, and without the need for a physical display being present for testing. In an embodiment, a user may determine desired settings just by looking at how the visual guides move as they adjust things. For example, adjusting the scale may allow the 3D working area to be closer or farther from the camera and can be helpful if scenes are made at different scales than one that already fits within the default scale of the camera rig. Adjusting the interocular distance may affect the amount of 3D working space to fit in the safe area. For example, for more compact scenes or a focus on a single object, a higher interocular distance with a smaller 3D area may produce a better 3D effect. While a long tunnel or open scene, will need to use a low interocular distance to expand the 3D area. In an embodiment, if the automatic adjustment is being used, that may determine the scale and interocular distance. The focal length may still be up to the user to decide. In other embodiments, the automatic adjustment process may also include automatic adjustment of the focal length.

Figure 4A:
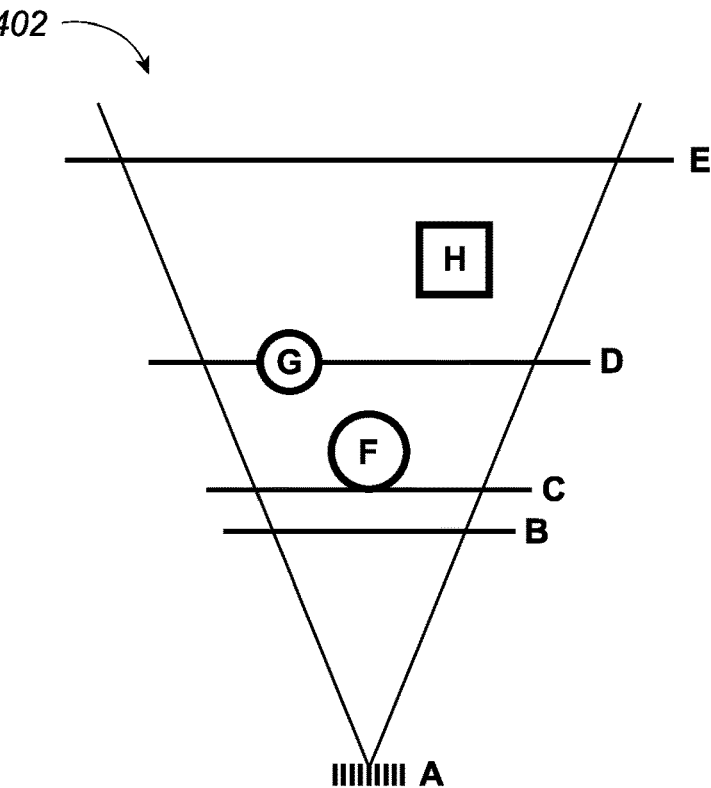
FIGS. 4A-4D illustrate the scene with one or more of the plurality of cameras set at different positions and/or orientations, in accordance with an embodiment of the present disclosure.
Figure 4B:
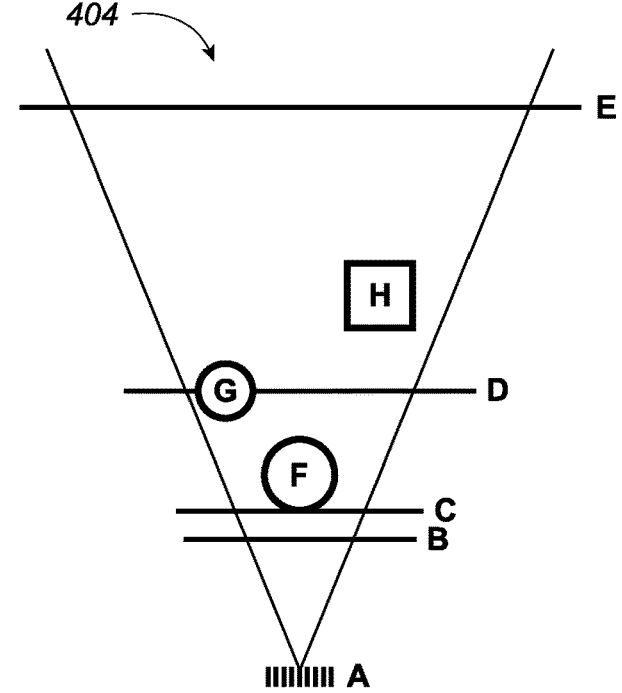
Figure 4C:
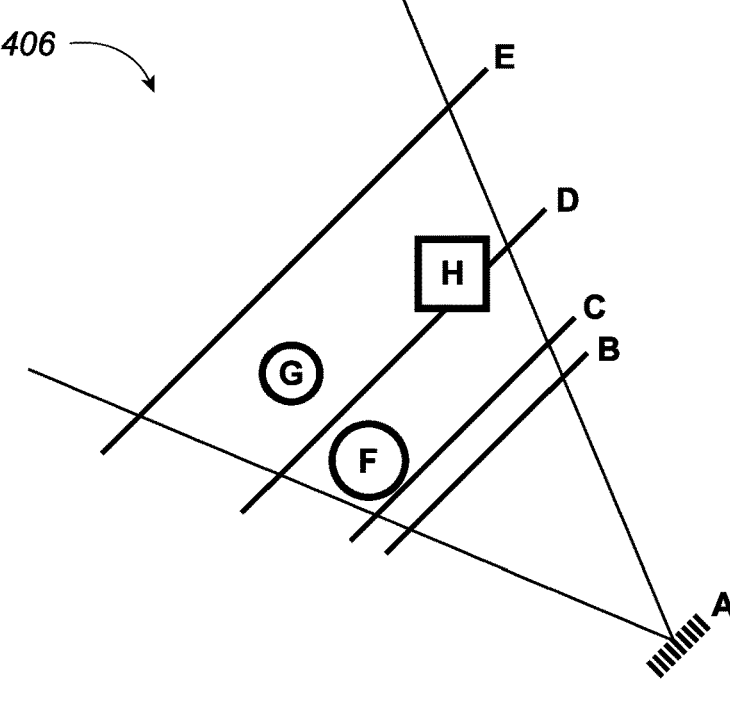
Figure 4D:
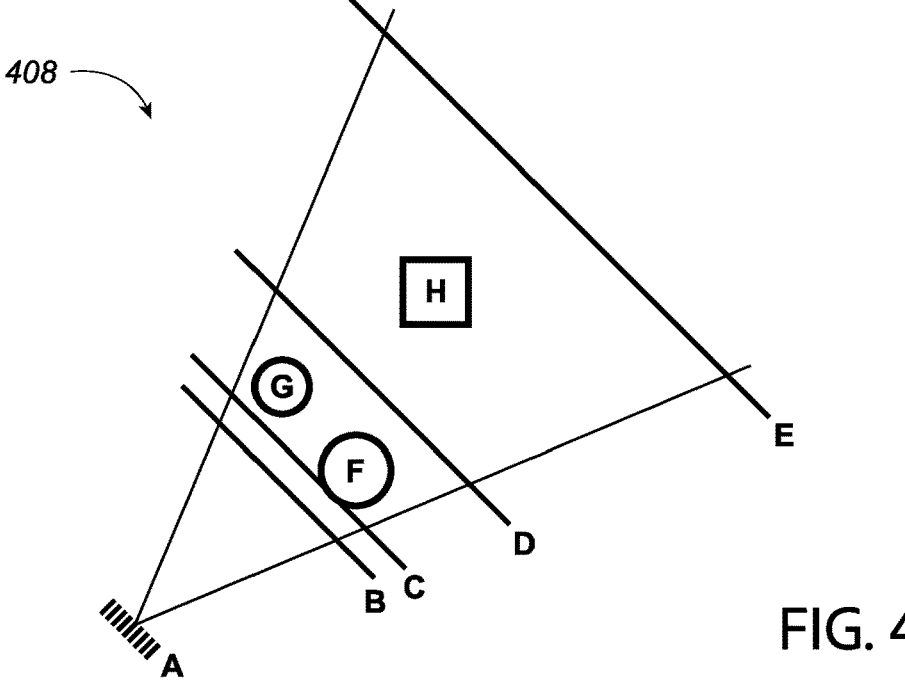

FIGS. 4A-4D illustrate the scene with one or more of the plurality of cameras set at different positions and/or orientations, in accordance with an embodiment of the present disclosure. FIGS. 4A-4D shows how the camera rig settings can be automatically adjusted in real-time based on the objects in the camera's view. The system will automatically adjust the camera scale and camera interocular distance to get the ideal amount of 3D working area for the scene, as described above. FIGS. 4A and 4B illustrate the same scenes 402 and 404 and objects, but with the cameras set at different positions. The objects in the scene in this example are stationary and do not move and whereby the camera is moving toward the subject matter. Visual guides B, C, D, and E and the subsequent camera rig parameters adjust automatically to fit all objects inside the working area between the pop guide C and depth guide E, as shown. A person of ordinary skill in the art could understand that this process could be similarly done with moving objects. Further, FIGS. 4C and 4D illustrate the same scenes 406 and 408 and objects, but with the cameras set at different positions and orientation such as the camera rig panning and rotating left (4C) and right (4D) in this example. In this case, the position and orientation of the camera both affect the visual guides B, C, D, and E and the resulting working area between the pop guide C and depth guide E, as shown.

It should be noted that the system and/or methods are compatible with various output formats and device types that may be used for viewing the content. For example, the formats and devices may include, but are not limited to, 2D, Multiview/multi-tile formats, Stereo, Interleaved (Interlaced images or video), 3D-capable devices such as mobile phones, tablets, desktop monitors, LCD displays, LCD video walls, spatial computing devices, and AR/VR and mixed reality headsets. Further, the disclosed embodiments may support different content and display orientations. For example, multiview/multi-tile content in a landscape orientation, and multiview/multi-tile content in a portrait orientation. Further, in accordance with the present disclosure, any UI elements being applied to different camera outputs (Mono, Multiview, and Stereo) will conform and duplicate to any 3D configuration without the need to create multiple UI canvases. For example, a mouse cursor can be applied to any 3D view while maintaining the views. A regular mouse cursor would only show a single cursor over the entire image, but the disclosed embodiments enable duplicating it and constraining it to the bounds of each view.

FIG. 5 illustrates a process flow 500 for generating advanced visualization, according to embodiments of the present invention. As depicted in FIG. 5, at step 502, the method 500 may include generating a visualization in a virtual environment using a camera rig. As described above, the camera rig A may generate a visualization of a scene depicting one or more visual guides B, C, D, and E and objects F, G, and H.

At step 504, the method 500 may include defining a volumetric space within the virtual or real life environment based on at least two visual guides. For example, the 3D working area and/or volumetric space I may be defined as the area between the visual guides C and E, that is, the pop guide and the depth guide. As described above, the pop guide defines the optimal position for forward projection of an object in a scene, and the depth guide defines an optimal position for depth positioning of the object in the scene. The area between the pop guide and the depth guide defines the volumetric space.

Further, at step 506, the method 500 may include updating one or more parameters associated with the camera rig. For example, the one or more parameters associated with the camera rig may include, but are not limited to, a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras. Further, the parameters may be updated and/or adjusted automatically or manually by a user or a combination of the two.

At step 508, the method 500 may include updating the volumetric space based on the updates to the one or more parameters. As described above, adjusting the position, orientation, and/or focal length of the camera rig may affect the visual guides and eventually, the 3D working area of the scene. For example, adjusting the scale may allow the 3D working area to be closer or farther from the camera and can be helpful if scenes are made at different scales than one that already fits within the default scale of the camera rig. Adjusting the interocular distance may affect the amount of 3D working space to fit in the safe area. For example, a higher interocular distance with a smaller 3D area will produce a better 3D effect for more compact scenes or a focus on a single object. At Step 510, the method concludes with Rendering to a device based on updated parameters of the camera rig.

FIGS. 6A-6D show representations of the system with predetermined formulas for adjusting the volumetric space and visual guide positions as a result of user input for various parameters of the camera rig, including but not limited to focal length of the lenses, interocular distances and scale of one or more of a plurality of cameras. The volumetric space is affected by at least 3 variables (focal length, interocular distance, scale), and as a result, one formula to extrapolate the positions of the visual guides would not be accurate. Therefore the system achieves accurate results and subsequent placement of the visual guides to provide an optimal 3D effect by blending between 2 formulas pursuant to user input.

Figure 6A:
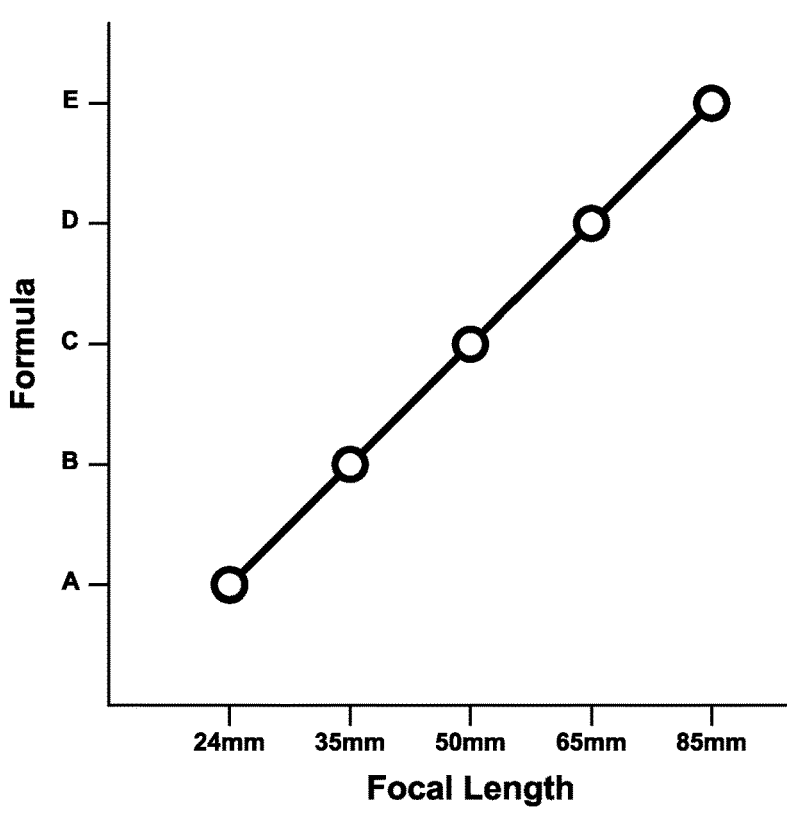
FIGS. 6A-6D show representations of the system adjusting the position of the visual guides to accurately define the volumetric space, interocular distance of the cameras and other parameters according to predetermined formulas that are associated with a particular focal length.

FIG. 6A shows multiple formulas (A, B, C, D, E) and how they are blended based on the changes to the focal length. Each formula has a static focal length (24 mm, 35 mm, etc.), and the visual guide position is calculated based on a weighted average of the two formulas.

Figure 6B:
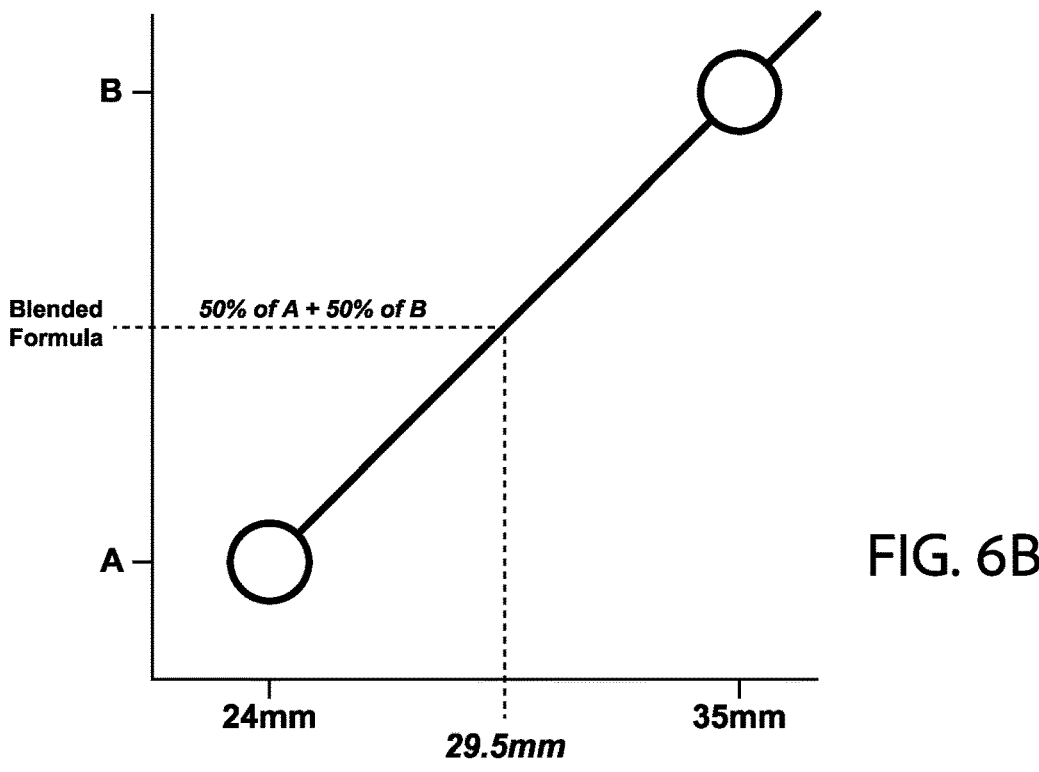
Figure 6C:
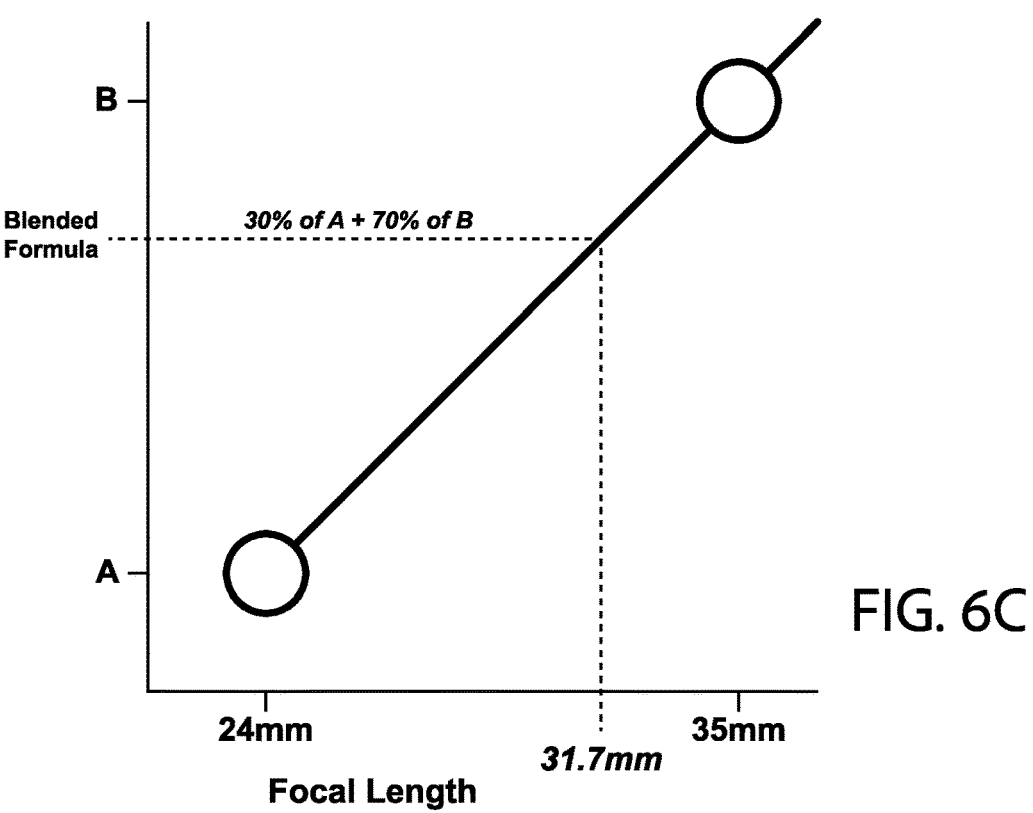
Figure 6D:
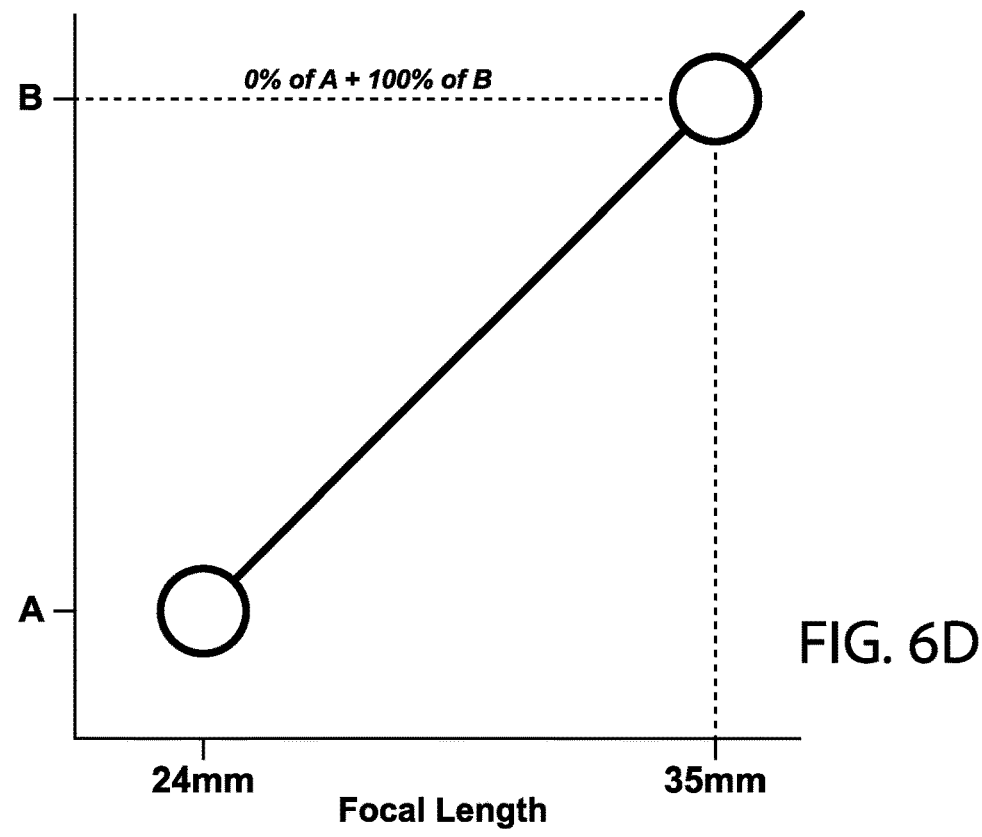

FIGS. 6B, 6C, and 6D, in contrast, show different examples of how the blending works between 2 formulas. FIG. 6B shows a user-selected focal length of 29.5 mm that is exactly in the middle of the 2 formulas A and B. In this example, the weight of each formula would be evenly weighted between formulas A and B to provide the optimal placement of visual guides and define accurate volumetric space.

FIG. 6C shows a user-selected focal length of 31.7 mm that results in Formula B having more weight and influence on the position of the visual guides and volumetric space than Formula A FIG. 6D shows a user-selected focal length of 35 mm equal to Formula B's optimal volumetric space settings for the focal length. As a result, Formula B is weighted at 100% and although the Formulas A and B are blended, Formula A has no influence on the placement of the visual guides with a weighting of 0.

Thus, the embodiments disclosed herein allow creators to change various content creation parameters in real time to affect the amount of 3D space and/or volume within a scene. It provides creators with the ability to create and produce multi-camera content accurately and more quickly. The camera rig and/or the virtual camera rig could be designed or adapted to operate with physical cameras and integrate with analog, digital, and hybrid virtual-production platforms.

In an embodiment, one or more computer-readable storage media may be used in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The terms "comprising," "including," and "having," as used in the claim and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may" and similar terms are used to indicate that an item, condition, or step being referred to is an optional (not required) feature of the disclosure.

The disclosure has been described with reference to various specific and preferred embodiments and techniques. However, it should be understood that many variations and modifications may be made while remaining within the spirit and scope of the disclosure. It will be apparent to one of ordinary skill in the art that methods, devices, device elements, materials, procedures, and techniques other than those specifically described herein can be applied to the practice of the disclosure as broadly disclosed herein without resort to undue experimentation. All art-known functional equivalents of methods, devices, device elements, materials, procedures, and techniques described herein are intended to be encompassed by this disclosure. Whenever a range is disclosed, all subranges and individual values are intended to be encompassed. This disclosure is not to be limited by the embodiments disclosed, including any shown in the drawings or exemplified in the specification, which are given by way of example and not of limitation. Additionally, it should be understood that the various embodiments of the networks, devices, and/or modules described herein contain optional features that can be individually or together applied to any other embodiment shown or contemplated here to be mixed and matched with the features of such networks, devices, and/or modules.

While the disclosure has been described with respect to a limited number of embodiments, those skilled in the art, having benefit of this disclosure, will appreciate that other embodiments can be devised which do not depart from the scope of the disclosure as disclosed herein.

We claim:

1. A system for visualization comprising:

a camera rig comprising a plurality of cameras configured to capture images from one or more perspectives;

at least two visual guides defining a volumetric space within an environment wherein the volumetric space is updated based on one or more parameters associated with the camera rig;

a visual pop guide defining an optimal position for forward projection of an object in a scene; and a visual depth guide defining an optimal position for depth positioning of the object in the scene;

wherein an area between the visual pop guide and the visual depth guide defines the volumetric space;

wherein the system adjusts an interocular distance between one or more of the plurality of cameras until the visual pop guide aligns to the determined position of the forward-most geometry of the object;

wherein the system adjusts an interocular distance between one or more of the plurality of cameras until the visual depth guide aligns to the determined position of the rear-most geometry of the object.

2. The system of claim 1, wherein the parameters of the camera rig may be adjusted manually to define an optimal volumetric space.

3. The system of claim 1, wherein the parameters of the camera rig may be adjusted automatically to define an optimal volumetric space.

4. The system of claim 1, further comprising a physical display associated with the camera rig such that the volumetric space is defined by properties of the physical display.

5. The system of claim 1, wherein the camera rig is physical, virtual, or a combination of the two.

6. The system of claim 1, wherein the one or more parameters associated with the camera rig include at least one of a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras.

7. The system of claim 1, wherein the camera rig is configured to capture one or more perspectives to generate a three-dimensional (3D) visualization.

8. The system of claim 1, wherein a threshold guide defines a theoretical distance or upper limit for forward projection of certain objects in a scene where captured content appears focused on the physical display while existing beyond recommended limits of the visual pop guide; and further comprising:

a two-dimensional (2D) guide defining both the front surface of a physical display device and the convergence point of the captured views wherein part of an object intersecting the visual guide will have neither negative nor positive parallax, and subject to the type of object, may appear two-dimensional (2D).

9. The system of claim 1, further comprising graphic user interface and production tool configured to enable a user to visualize, modify, and automate the one or more parameters associated with the camera rig.

10. A method comprising:

generating a visualization in a virtual environment using a camera rig comprising a plurality of cameras configured to capture images from one or more perspectives; and defining a volumetric space within the virtual environment based on at least two visual guides, wherein the volumetric space is updated based on one or more parameters associated with the camera rig;

casting an invisible plane forward from the camera rig;

reverting a cast distance when the invisible plane hits an object in the virtual environment; and continuously reducing the cast distance to determine a position of a forward or rear-most geometry of the object or scene.

11. The method of claim 10, wherein the one or more parameters associated with the camera rig include at least one of a focal length of one or more of the plurality of cameras, interocular distance between one or more of the plurality of cameras, a convergence point of camera views, a scale of the camera rig, a position of one or more of the plurality of cameras, and an orientation of one or more of the plurality of cameras.

12. The method of claim 10, further comprising the capture of one or more perspectives to generate a three-dimensional (3D) visualization.

13. The method of claim 10, wherein the at least two visual guides include:

a visual pop guide defining an optimal position for forward projection of an object in a scene; and a visual depth guide defining an optimal position for depth positioning of the object in the scene, wherein an area between the visual pop guide and the visual depth guide defines the volumetric space.

14. The method of claim 13, further comprising:

defining a theoretical distance or upper limit for forward projection of certain objects in a scene where captured content appears focused on the physical display while existing beyond recommended limits of the visual pop guide; and defining the front surface of a physical display device and the convergence point of the captured views wherein part of an object intersecting the visual guide will have neither negative nor positive parallax, and subject to the type of object, may appear two-dimensional (2D).

15. The method of claim 14, further comprising:

adjusting a scale of the camera rig, based on the determined position of the forward or rear-most geometry of the object or scene, to align the two-dimensional (2D) guide with a center point of the object.

16. A method comprising:

generating a visualization in a virtual environment using a camera rig comprising a plurality of cameras configured to capture images from one or more perspectives;

defining a volumetric space within the virtual environment based on at least two visual guides, wherein the at least two visual guides include a visual pop guide defining an optimal position for forward projection of an object in a scene and a visual depth guide defining an optimal position for depth positioning of the object in the scene, wherein an area between the visual pop guide and the visual depth guide defines the volumetric space, wherein the volumetric space is updated based on one or more parameters associated with the camera rig; and adjusting an interocular distance between one or more of the plurality of cameras until the pop guide aligns to the determined position of the forward or rear-most geometry of the object.

17. The method of claim 16, further comprising:

automatically adjusting the scale and/or interocular of the cameras for any focal length as determined by changes to one or more of the plurality of cameras determined by the position of the forward or rear-most geometry of the object or scene.

18. A non-transitory computer-readable storage medium, having stored thereon a computer-executable program which, when executed by at least one processor, causes the at least one processor to:

generate a visualization in a virtual environment using a camera rig comprising a plurality of cameras configured to capture images from one or more perspectives; and define a volumetric space within the virtual environment based on at least two visual guides, wherein the at least two visual guides include a visual pop guide defining an optimal position for forward projection of an object in a scene and a visual depth guide defining an optimal position for depth positioning of the object in the scene, wherein an area between the visual pop guide and the visual depth guide defines the volumetric space, wherein the volumetric space is updated based on one or more parameters associated with the camera rig;

wherein the system adjusts an interocular distance between one or more of the plurality of cameras until the visual pop guide aligns to the determined position
of the forward-most geometry of the object;
wherein the system adjusts an interocular distance
between one or more of the plurality of cameras until
the visual depth guide aligns to the determined position 5
of the rear-most geometry of the object.

* * * * *